US012389903B2

(12) United States Patent
Pettinato et al.

(10) Patent No.: US 12,389,903 B2
(45) Date of Patent: Aug. 19, 2025

(54) LOW FLUID LEVEL DETECTION DEVICE

(71) Applicant: LIFELINE SCIENTIFIC, INC., Itasca, IL (US)

(72) Inventors: David Pettinato, Schaumburg, IL (US); Jeffrey Allen Doruff, Elgin, IL (US); Christopher Paul Steinman, Sandy, UT (US)

(73) Assignee: LIFELINE SCIENTIFIC, INC., Itasca, IL (US)

( * ) Notice: Subject to any disclaimer, the term of this patent is extended or adjusted under 35 U.S.C. 154(b) by 899 days.

(21) Appl. No.: 17/483,020

(22) Filed: Sep. 23, 2021

(65) Prior Publication Data
US 2023/0092486 A1 Mar. 23, 2023

(51) Int. Cl.
*A01N 1/148* (2025.01)
*A01N 1/143* (2025.01)
*A01N 1/144* (2025.01)

(52) U.S. Cl.
CPC .............. *A01N 1/148* (2025.01); *A01N 1/143* (2025.01); *A01N 1/144* (2025.01)

(58) Field of Classification Search
CPC ......................... A01N 1/0273; A01N 1/0252
See application file for complete search history.

(56) References Cited

U.S. PATENT DOCUMENTS 3,914,954 A   10/1975  Doerig
7,998,725 B2  8/2011   Schein et al.

FOREIGN PATENT DOCUMENTS

| CN | 111657262 A | 9/2020 | | |
|---|---|---|---|---|
| CN | 111903665 A | 11/2020 | | |
| JP | S48-035688 A | 5/1973 | | |
| NO | 303611 B1 | * 8/1998 | ............... | A01N 1/02 |
| WO | WO-9630111 A1 | * 10/1996 | ............... | A01N 1/02 |
| WO | WO-2004089085 A2 | * 10/2004 | ............... | A01N 1/02 |
| WO | 2007/025215 A2 | 3/2007 | | |
| WO | 2009/020412 A1 | 2/2009 | | |

OTHER PUBLICATIONS

Duong, Hieu et al., Hypothermia, Jan. 2024, Stat Pearls Publishing (Year: 2024).*
Mar. 26, 2024 International Preliminary Report on Patentability issued in International Application No. PCT/US2021/052706.
Jun. 27, 2022 International Search Report and Written Opinion issued in International Patent Application No. PCT/US2021/052706.
Apr. 30, 2024 Communication issued in European Patent Application No. 21798227.1.
Mar. 4, 2025 Office Action issued in Japanese Patent Application No. 2024-518345.
Jun. 4, 2025 Decision to Grant issued in Japanese Patent Application No. 2024-518345.

* cited by examiner

*Primary Examiner* — Elizabeth A Robinson
*Assistant Examiner* — Jonathan E Lepage
(74) *Attorney, Agent, or Firm* — Oliff PLC

(57) ABSTRACT

A portable housing for holding an organ or tissue for at least one of perfusion, storage, diagnosis, and transport of the organ or tissue includes a main chamber within which the organ or tissue and a liquid perfusate for the organ or tissue may be located, and it also includes a secondary chamber that is within the main chamber and that is for holding the liquid perfusate. A volume of the secondary chamber is less than a volume of the main chamber, and a top of the secondary chamber is below a top of the main chamber.

11 Claims, 11 Drawing Sheets

LOW FLUID LEVEL DETECTION DEVICE

BACKGROUND

The present disclosure relates to apparatuses and methods for storing, transporting, and/or perfusing one or more organs, tissues, or the like to monitor, sustain, and/or restore viability of those organs or tissues.

Preservation of organs by machine perfusion with a liquid perfusate solution has been accomplished at hypothermic temperatures with or without computer control. See, e.g., U.S. Pat. Nos. 5,149,321; 5,395,314; 5,584,804; 5,709,654; 5,752,929; and 5,827,222, which are hereby incorporated by reference. Hypothermic temperatures provide a decrease in organ metabolism, lower energy requirements, delay depletion of high energy phosphate reserves and accumulation of lactic acid, and retard morphological and functional deterioration associated with disruption of blood supply.

SUMMARY

Certain machine perfusion devices achieve hypothermic temperatures for the organ or tissue therein by cooling a reservoir of the liquid perfusate solution in contact with the organ. Doing so can provide a backup functionality because the cooled perfusate reservoir allows the device to revert to static cold storage ("SCS") in case of failure of the machine perfusion. But in case of a leak of the cold liquid perfusate outside the container holding the organ, this backup SCS too may be compromised. A need therefore exists for a machine perfusion device that can better ensure that SCS remains a viable backup option, even in case of leak or similar malfunction.

Thus disclosed herein is a portable housing for holding an organ or tissue for at least one of perfusion, storage, diagnosis, and transport of the organ or tissue. The portable housing may include a main chamber within which the organ or tissue and a liquid perfusate for the organ or tissue may be located, and it may also include a secondary chamber that is within the main chamber and that is for holding the liquid perfusate. A volume of the secondary chamber may be less than a volume of the main chamber, and a top of the secondary chamber may be below a top of the main chamber.

In combination with any of the above or below features, the volume of the main chamber may be from 1.0 L to 2.0 L, and the volume of the secondary chamber may be from 8 mL to 12 mL.

In combination with any of the above or below features, the top of the secondary chamber may be lower than the top of the main chamber by 1.3 in. to 2.1 in.

In combination with any of the above or below features, the secondary chamber may be disposed along a wall that forms the main chamber.

Also disclosed is an apparatus for holding an organ or tissue for at least one of perfusion, storage, diagnosis, and transport of the organ or tissue. This apparatus may include the portable housing having the above features, and it may also include a plurality of tubes for moving the liquid perfusate to and from the portable housing. An end of a first tube of the plurality of tubes may be located within the secondary chamber.

In combination with any of the above or below features, the apparatus may be configured so that the liquid perfusate exits the portable housing by way of the end of the first tube, which is at a fixed position within the secondary chamber.

In combination with any of the above or below features, the apparatus may comprise a pump for circulating the liquid perfusate to perfuse the organ or tissue, the first tube providing an inlet to the pump for the liquid perfusate.

In combination with any of the above or below features, the apparatus may include a standpipe that forms the secondary chamber and that includes an attachment portion by which the standpipe is secured within the main chamber so that a position of the standpipe is controlled relative to the top of the main chamber.

In combination with any of the above or below features, the attachment portion may include a hole through which the first tube projects before entering the secondary chamber.

In combination with any of the above or below features, the apparatus may be configured to perfuse the organ or tissue with the liquid perfusate by way of the plurality of tubes and a pump, during the perfusion the liquid perfusate flowing from the main chamber to the secondary chamber to exit the portable housing by way of the first tube located within the secondary chamber. The apparatus may further comprise a bubble detector configured to detect air in the liquid perfusate having exited the portable housing by way of the end of the first tube, and the apparatus may be configured to stop the perfusion of the organ or tissue if the bubble detector detects air in the liquid perfusate having exited the portable housing by way of the end of the first tube.

In combination with any of the above or below features, the liquid perfusate may be chilled to a hypothermic temperature.

Also disclosed herein is a method of at least one of perfusion, storage, diagnosis, and transport of an organ or tissue. The method may include a step of placing the organ or tissue in a main chamber of a portable housing so that a liquid perfusate in the main chamber is above a top of a secondary chamber that is located in the main chamber, a volume of the secondary chamber being less than a volume of the main chamber, and a top of the secondary chamber being below a top of the main chamber. And the method may further include perfusing the organ or tissue so that the liquid perfusate flows from the main chamber to the secondary chamber and so that the liquid perfusate exits the portable housing by way of the secondary chamber.

In combination with any of the above or below features, the liquid perfusate may exit the portable housing by way of a first tube of a plurality of tubes for moving the liquid perfusate to and from the portable housing, an end of the first tube being located within the secondary chamber.

In combination with any of the above or below features, the first tube may provide an inlet to a pump for circulating the liquid perfusate to perfuse the organ or tissue.

In combination with any of the above or below features, the method may further include stopping the perfusion if a bubble detector detects air in the liquid perfusate having exited the portable housing by way of the first tube.

And in combination with any of the above features, the method may further include stopping the perfusion if the liquid perfusate is no longer above the top of the secondary chamber.

These and other aspects of the present disclosure will be described with reference to the attached drawings and following detailed description.

DETAILED DESCRIPTION

Figure 1:
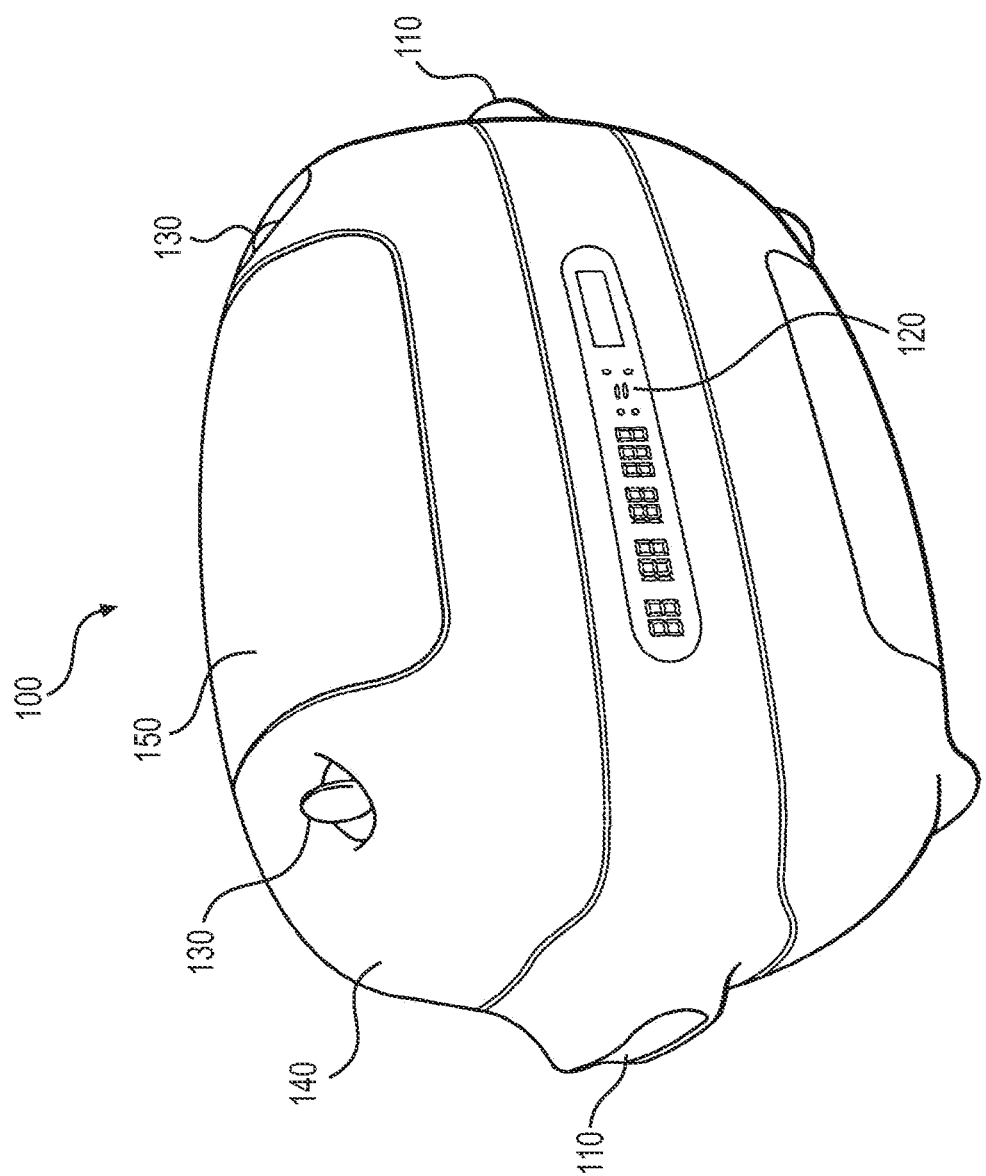
FIG. 1 shows an external view of an organ transport and perfusion device.

For a general understanding of the features of the present disclosure, reference is made to the drawings. In the drawings, like reference numerals have been used throughout to designate like elements.

The invention is described herein largely in the context of apparatuses and methods involved in transport, storage, perfusion, and/or diagnosis of tissues and/or organs. However, the inventive apparatuses and methods have many other applications, and thus the various inventive structures, devices, apparatuses, and methods described herein should not be construed to be limited to particular contexts of use. Various features of the present disclosure are particularly suitable for use in the context of, and in conjunction and/or connection with, the features of the apparatuses and methods disclosed in U.S. Pat. Nos. 7,998,725 and 7,678,563, the entire disclosures of both of which are incorporated by reference herein.

FIG. 1 shows an external view of an organ transport and perfusion device 100. The device 100 may be sized and configured for perfusing a kidney, although perfusion of other organs, e.g., liver, heart, and lung, is within the scope of the present invention. The device 100 may operate using a liquid perfusate solution cooled to hypothermic temperatures that are passively maintained by way of an ice bath in the device. The device 100 may be designed for transportation with a kidney "on-board" from a donor hospital to a recipient hospital, all the while maintaining viability of the donor kidney. During transportation, the device 100 and therefore the donor kidney may be protected from shifts in environmental conditions, e.g., changes in temperature, and the device may thus ensure that the ambient environment of the kidney while being perfused remains stable. As explained previously, the fact that the kidney may also be immersed in a cold liquid perfusate solution during transport and perfusion ensures optimal conditions.

In greater detail, the device 100 of FIG. 1 may have a stable base to facilitate an upright position and handles 110 for carrying the device. The device 100 may also be fitted with a shoulder strap and/or wheels to assist in carrying the device, and a control panel 120 may also be provided on, say, an exterior of the device. The control panel 120 may display information such as, but not limited to, infusion pressure, attachment of the tube frame (discussed later), power on/off, error or fault conditions, flow rate, flow resistance, infusion temperature, bath temperature, pumping time, battery charge status, temperature profile (maximums and minimums), cover open or closed, history log or graph, and additional status details and messages, some or all of which may preferably be further transmittable to a remote location for data storage and/or analysis. Flow and pressure sensors or transducers in the device 100 may also be provided to calculate various organ characteristics such as pump pressure and vascular resistance of the organ, which can be stored in computer memory to allow for analysis of, for example, vascular resistance history, as well as to detect faults in the apparatus such as elevated pressure and to display corresponding alerts or error status.

The device 100 may also have latches 130 that require positive user action to open, thus avoiding the possibility that the device 100 inadvertently opens during transport. Latches 130 may hold top or cover 140 in place. The top or cover 140 or a portion thereof may be constructed with an optically transparent material to provide for viewing of a cassette (described later) and organ perfusion status. The device 100 may be configured with a cover open detector that monitors and causes to be displayed on the control panel 120 whether the top or cover 140 is open or closed. The device 100 may also be configured with an insulating exterior of various thicknesses to allow the user to configure or select the appropriate device 100 for varying extents and distances of transport. A compartment 150 may also be provided to hold patient and organ data such as charts, testing supplies, additional batteries, hand-held computing devices, and/or may be configured with means for displaying a UNOS label and/or identification and return shipping information.

Figure 2:
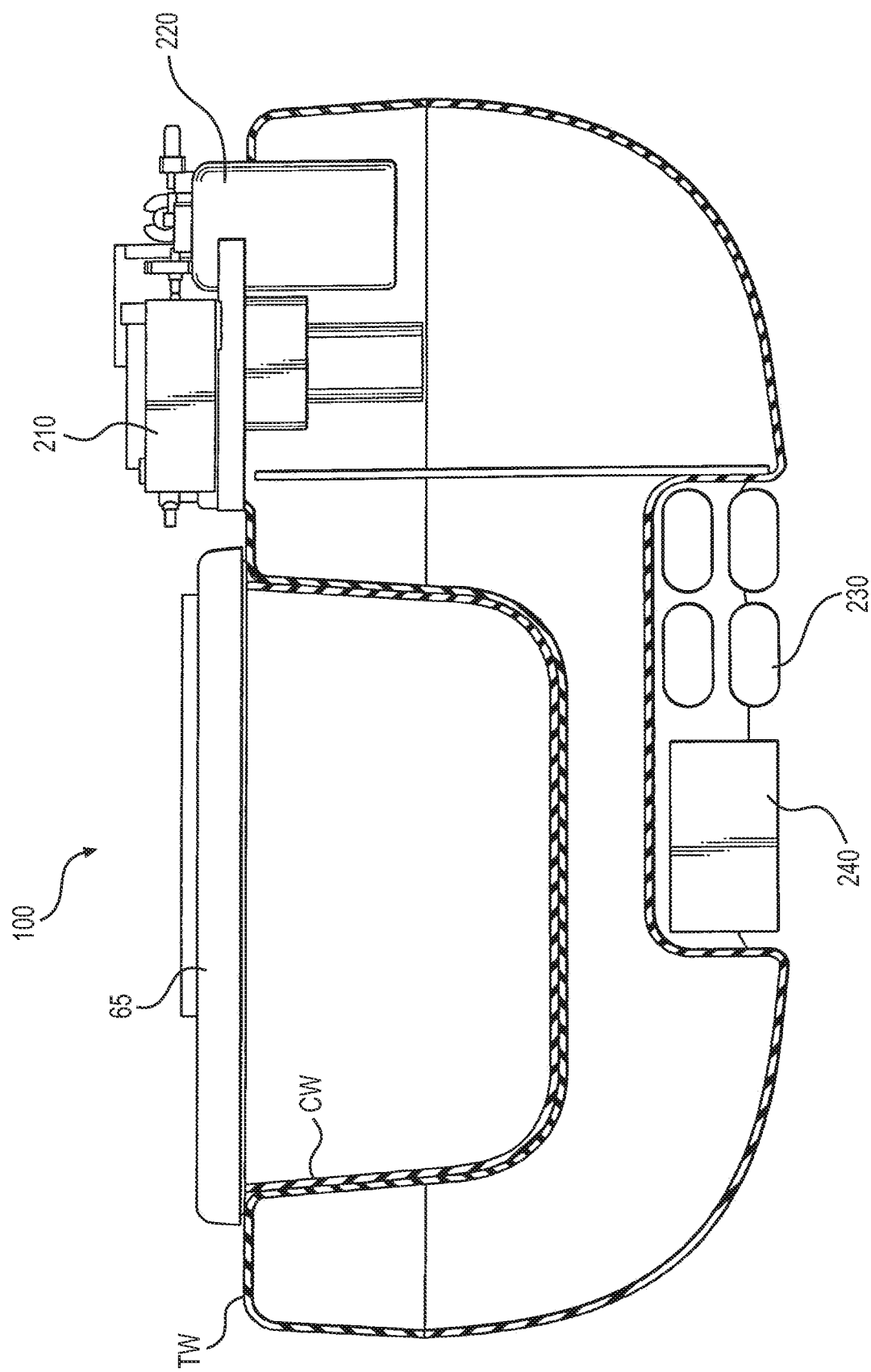
FIG. 2 shows a cross-section view of the device of FIG. 1.

FIG. 2 shows a cross-section view of the device 100, which contains a cassette 65 and a pump 210. The cassette 65 may preferably be placed into or taken out of the device 100 without disconnecting a tubeset (described later) from the cassette 65, thus maintaining sterility of the organ or tissue in the cassette. Sensors in the device 100 may detect the presence of the cassette 65 in the device, and depending on the sensor, may read the organ identity from a barcode or radio frequency, e.g., RFID chip, or other "smart" tag that may be attached or integral to the cassette 65. This can allow for automated identification and tracking of the organ or tissue in the cassette 65 and may help monitor and control the chain of custody. A global positioning system, which may be integrated with cellular radio technology, e.g., GSM, CDMA, or an equivalent, may be added to the device 100 and/or cassette 65 to facilitate global tracking and monitoring via, e.g., the Internet, of the transporter and the organ therein. The device 100 may be interfaceable to a computer network by hardwire connection to a local area network or by wireless communication while in transit. This interface may allow data such as perfusion parameters, vascular resistance, and organ identification and transporter and cassette location to be tracked and displayed in real-time or captured for future analysis.

The device 100 may also contain a filter 220 to remove sediment and other particulate matter, preferably ranging in size from 0.05 to 15 microns in diameter or larger, from the liquid perfusate to prevent clogging of the apparatus or the organ. The device 100 may preferably also contain batteries 230, which may be located at the bottom of the device, beneath the pump 210, or at any other location but preferably one that provides easy access to change the batteries 230. The batteries 230 may be rechargeable outside of the device 100 or while within the device 100 and/or may preferably be hot-swappable one at a time. The batteries 230 are preferably rechargeable rapidly and without full discharge. The device 100 may also provide an additional storage space 240, for example, at the bottom of the device for power cords, batteries, and other accessories. And the device 100 may include a power port for a DC hookup, e.g., to a vehicle such as an automobile or airplane, and/or for an AC hookup.

As shown in FIG. 2 and explained in greater detail below, the cassette wall CW is preferably configured to mate with a corresponding configuration of inner device wall TW to maximize contact, and thus heat transfer, therebetween.

Figure 3:
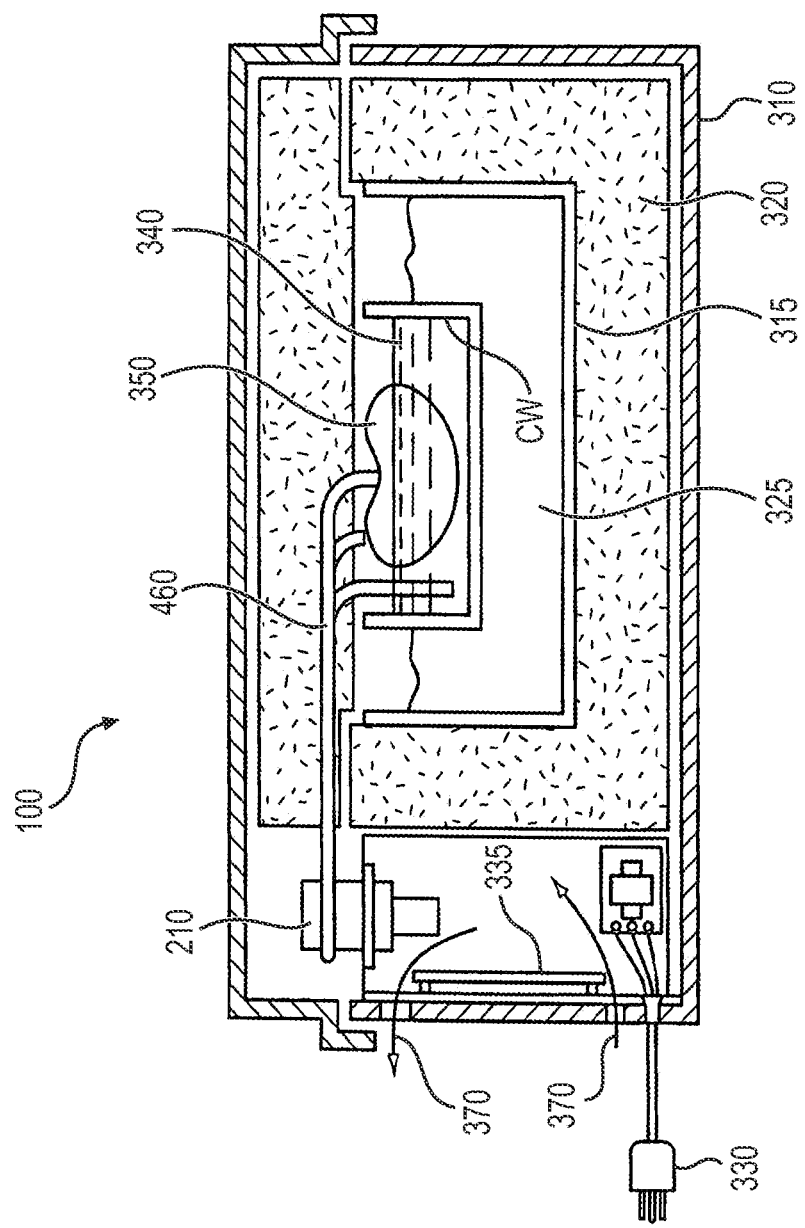
FIG. 3 shows an alternative cross-section view of the device of FIG. 1.

FIG. 3 shows an alternative cross-section of the device 100. In FIG. 3, the device 100 may have an outer enclosure 310 which may, for example, be constructed of metal or preferably a plastic or synthetic resin that is sufficiently strong to withstand penetration and impact. The device 100 may contain insulation 320, preferably a thermal insulation made of, for example, glass wool or expanded polystyrene. The insulation 320 may be various thicknesses ranging from 0.5 inches to 5 inches thick or more, preferably 1 to 3 inches, and even more preferably approximately 2 inches thick. The device 100 may be cooled by coolant 325 that may be, for example, an ice and water bath or a cryogenic material. If a cryogenic material is used, the design may be such that organ freezing is prevented. If an ice and water bath is used, the ice and water mixture may preferably be an initial mixture of approximately 1 to 1, but the ice and water bath may alternatively be initially frozen solid. The device 100 may be configured to hold various amounts of coolant, preferably up to 10 to 12 liters. The ice and water bath may be preferable because it is inexpensive and generally cannot become cold enough to freeze the organ. The coolant 325 preferably lasts for a minimum of 6 to 12 hours and more preferably lasts for a minimum of 30 to 50 hours without changing the coolant. The level of the coolant 325 may, for example, be viewed through a transparent region of the device 100, or it may be automatically detected and monitored by a sensor. The coolant 325 can preferably be replaced without stopping perfusion or removing the cassette 65 from the device 100, and it may preferably be maintained in a watertight compartment 315 of the device. For example, an inner transporter wall TW as shown in FIG. 2 may be interposed between the coolant 325 and the cassette wall CW in the apparatus of FIG. 3. The compartment 315 may preferably prevent loss of the coolant 325 in the event the device 100 is tipped or inverted. In use, heat may be conducted from the walls of the cassette 65 or the liquid perfusate reservoir therein into the coolant 325 so as to enable control of the temperature to within a desired range. And as mentioned previously, the coolant 325 may constitute a failsafe cooling mechanism because the device 100 may automatically revert to static cold storage in the case of power loss, electrical or computer malfunction, or an inadvertent loss of liquid perfusate due to a leak within tubing of the cassette 65. The device 100 may also be configured with a heater to raise the temperature of the liquid perfusate solution.

The device 100 may be powered by batteries such as the batteries 230 shown in FIG. 2 or by electric power provided through a plug 330. An electronics module 335 may also be provided in the device. This electronics module 335, which may include a processor, CPU, and/or memory such as RAM, ROM, etc., may control the pump 210, the various sensors, etc. that enable perfusion of the organ or tissue 350 within the cassette 65 with the liquid perfusate solution, and the control panel 120. The electronics module 335 may be cooled by vented air convection 370, and it may further be cooled by a fan. Preferably, the electronic module 335 may be positioned separately from the perfusion tubes discussed below to prevent the liquid perfusate solution from wetting the electronics module and to avoid adding extraneous heat from the electronics module to the liquid perfusate solution in the tubing. As discussed later, the pump 210 of the device may provide pressure to perfusate tube 460 of a tube set to deliver liquid perfusate solution 340 to the organ or tissue 350. And the device 100 and cassette 65 may accommodate various amounts of the liquid perfusate solution 340, up to 3 to 5 liters for example. Preferably, approximately 1 liter of a hypothermic liquid perfusate solution 340 may be used to perfuse the organ or tissue 350.

The cassette 65 and the device 100 may preferably be constructed to fit or mate such that efficient heat transfer is enabled. Preferably, the device 100 may contain a compartment 215 for receiving the cassette and holding coolant therein. The device 100 may preferably rely on conduction to move heat from the cassette 65 to the coolant contained in the compartment 215. This movement of heat allows the device 100 to maintain a desired temperature of the liquid perfusate solution. The geometric elements of cassette 65 and the device 100 are preferably constructed such that, when the cassette 65 is placed within the device 100, the contact area between the cassette 65 and the device 100 is as large as possible and they are secured for transport.

Figure 4A:
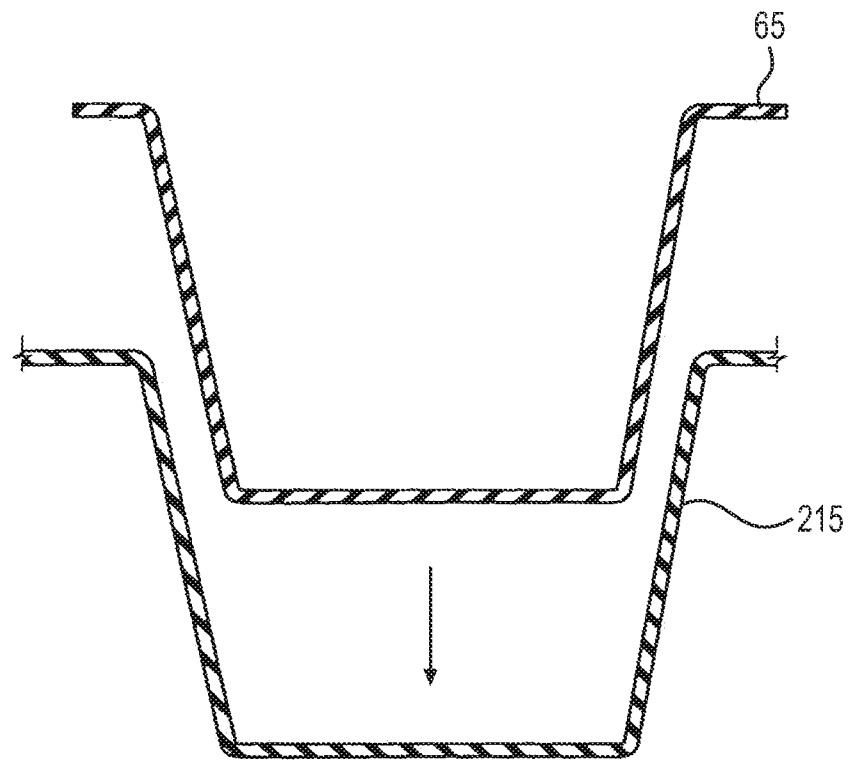
FIGS. 4A and 4B show the mating of an organ cassette with a compartment of the device of FIG. 1.
Figure 4B:
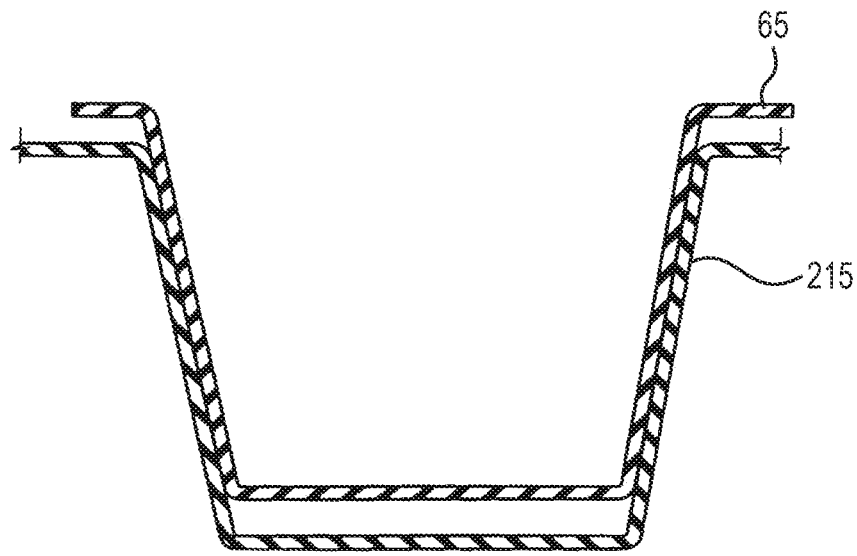

FIGS. 4A and 4B show an example of this geometry between the cassette 65 and the compartment 215 containing coolant. The interface geometry between the cassette 65 and the compartment 215 may preferably be designed so that the cassette 65 will wedge into a cavity created by the compartment 215. Accordingly, the angles of the side walls are substantially equal and, thus, all side walls of the cassette 65 make contact with the side walls of the compartment 215 regardless of the shape of the cassette sides or compartment sides, such as flat or curved. Having the included angles substantially equal allows the surfaces of the cassette and the compartment 215 to make contact even when influenced by the thermal expansion and contraction of the walls and mechanical tolerances.

The height of the cassette 65 above the compartment 215 is determined by the mating surfaces of the cassette 65 and the compartment 215. As shown in FIG. 4B, the bottom of the cassette does not have to rest on the bottom of the compartment 215, but it can rest at the bottom in embodiments in which the shape of the cassette 65 and that of the compartment 215 allow it. It should be appreciated that the shape of the cassette 65 and that of the compartment 215 can be any shape, such as for example a truncated cone, that allows for maximum contact and therefore maximum heat transfer between them.

As discussed previously, heat is conducted from the walls of the cassette 65 into coolant within the compartment 215, thereby enabling control within the desired temperature range. The coolant can again also provide a failsafe cooling mechanism because the device 100 may automatically revert to cold storage in the case of power loss, electrical or computer malfunction, or a leak of the liquid perfusate from the cassette tubing. The device 100 may again also be configured with a heater to raise the temperature of the perfusate.

Figure 5:
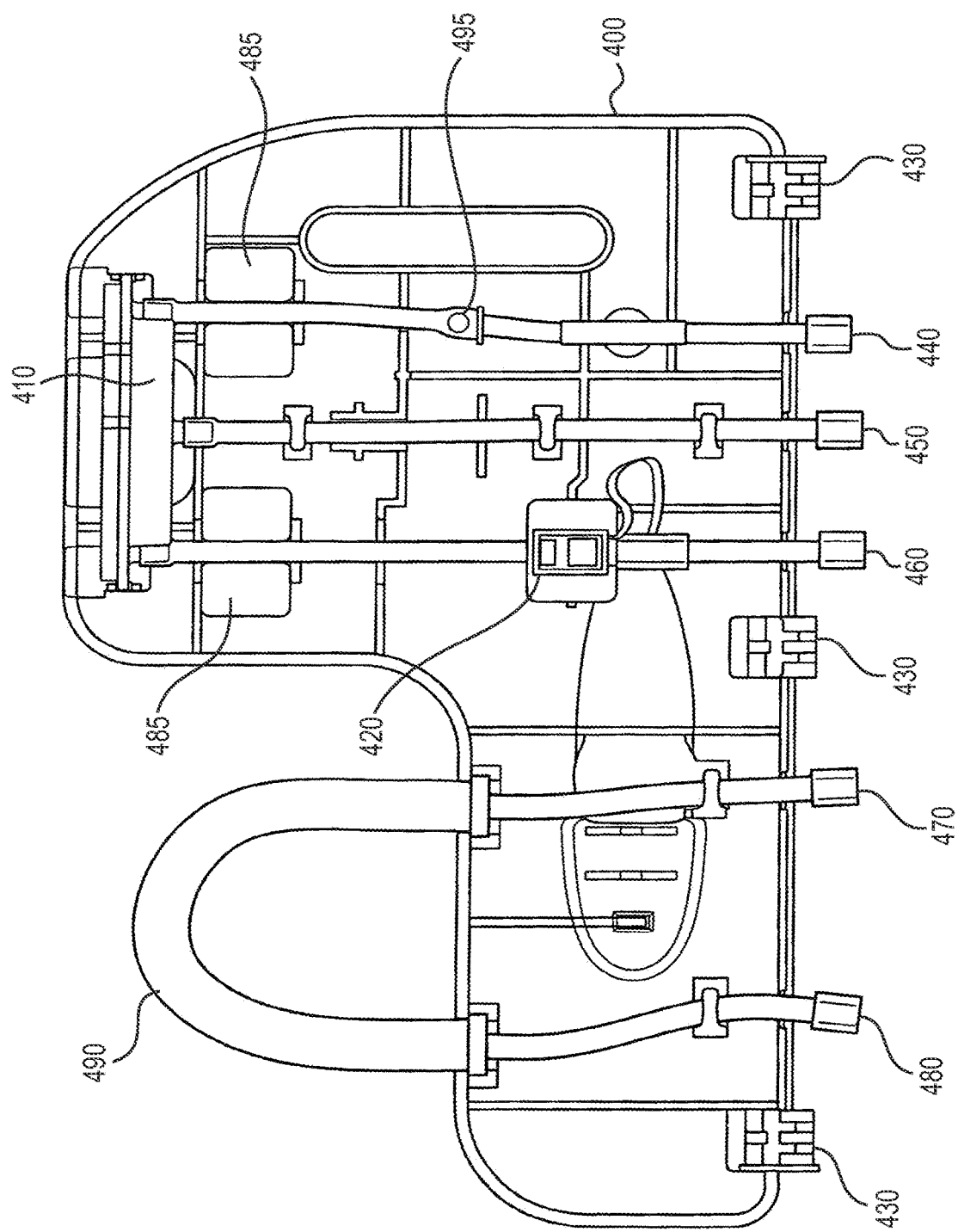
FIG. 5 shows a tube frame with a tube set useable with the device of FIG. 1.
Figure 6:
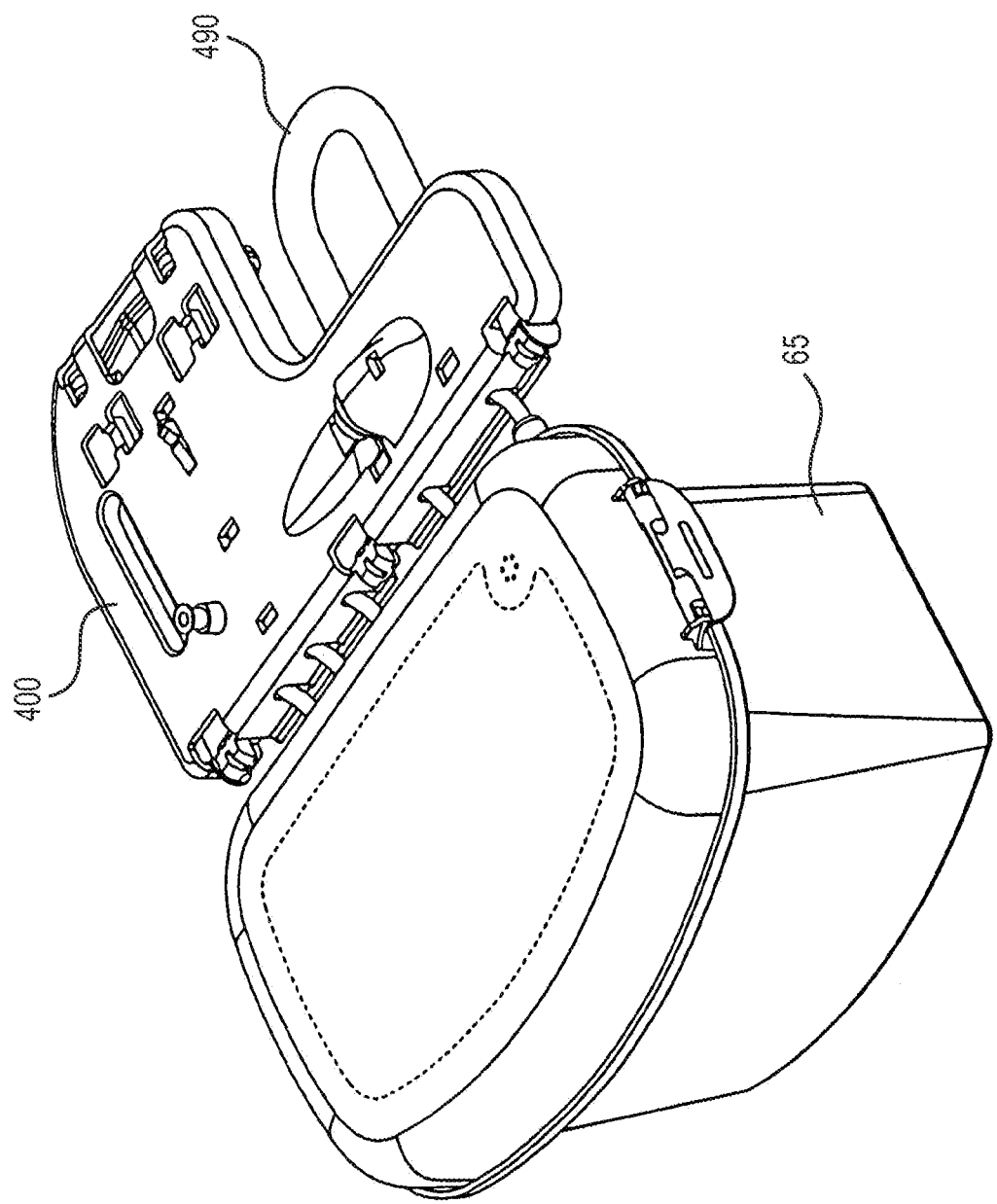
FIG. 6 shows the tube frame of FIG. 5 connected to an organ cassette.

FIG. 5 shows a tube frame 400, which may be used for holding the aforementioned tube set. The tube frame 400 may be formed of a material that is light but durable, plastic for example, so that tube frame 400 is highly portable. The tube frame 400 may also be designed to hold the tubing of the tube set in desired positions. Having the tubing in set positions allows for easier installation and connection with devices such as the cassette 65 as shown in FIG. 6. The cassette 65 and the tube frame 400 may then preferably be mated with the device 100.

When the tube frame 400 is mated with the cassette 65, the tube set may already be connected with the cassette 65. For example, tube 470 may provide an inlet to the pump 210 for liquid perfusate solution stored in the cassette 65. The liquid perfusate may travel through tube 490, back out outlet 480, and then through a filter which may, say, be located inside or outside, for example, below, the cassette 65. After traveling through the filter, the liquid perfusate solution may travel to tube 440 and then into a bubble trap 410. A sample port 495 may be provided with the tube frame 400 to allow for drawing liquid out of or injecting liquid into the tube 440. Liquid perfusate may travel into the bubble trap 410 in tube 440 and then travel out of the bubble trap in tube 460, which may carry the liquid perfusate solution into the cassette 65, for example, to infuse and/or wash the organ or tissue therein. The tube 450 may carry liquid or gas leaving the bubble trap 410 directly into the cassette 65 and thus bypass infusion of, but optionally wash, the organ or tissue.

It should be appreciated that the tube frame 400 may hold other devices in addition to tubes. For example, the tube frame 400 may hold the bubble trap device 410 and a pressure sensor 420 used to control the pump 210. It should also be appreciated that the tube frame 400 and the tube set may be connected to a variety of devices such as the organ perfusion device 100 or an organ diagnostic device, as well as a cassette and/or transporter.

The tube frame 400 may preferably be attachable to a portion of the device 100. To that end, the tube frame 400 may be connected to the device 100, and other devices, by way of snaps 430 or other structures that will securely hold the tube frame to the device. Sensors, for example mechanical or electrical sensors, in device 100 may be provided to detect the presence of the tube frame 400 in the device 100. If the tube frame 400 is not properly attached to the device 100, the sensors may be configured to send an appropriate alert message to the control panel 120 for notifying the user of a problem. If no action is taken to properly attach the tube frame 400 in a given amount of time automatically set or programmed by the user, the device 100 may be programmed to prevent the beginning of perfusion. It should be appreciated that, if perfusion has begun and the tube frame 400 is not appropriately set, the device 100 can be programmed to stop perfusion.

Another valuable feature of the tube frame 400 is that it makes a stationary surface for the tubes 450 and 460. These tubes may be used to route liquid perfusate solution either directly to the organ or tissue or, bypassing the organ, into a reservoir of the liquid perfusate solution within the cassette 65. It may be desirable to have the tube 450 and the tube 460 located in relatively fixed positions so that the routing may be done by pinching the tubing so that no liquid perfusate can pass. The tubes may, for example, be pinched by a solenoid (not shown) located on the device 100 that drives a blade that pinches tube 450 and/or tube 460 against the tube frame 400.

Figure 7:
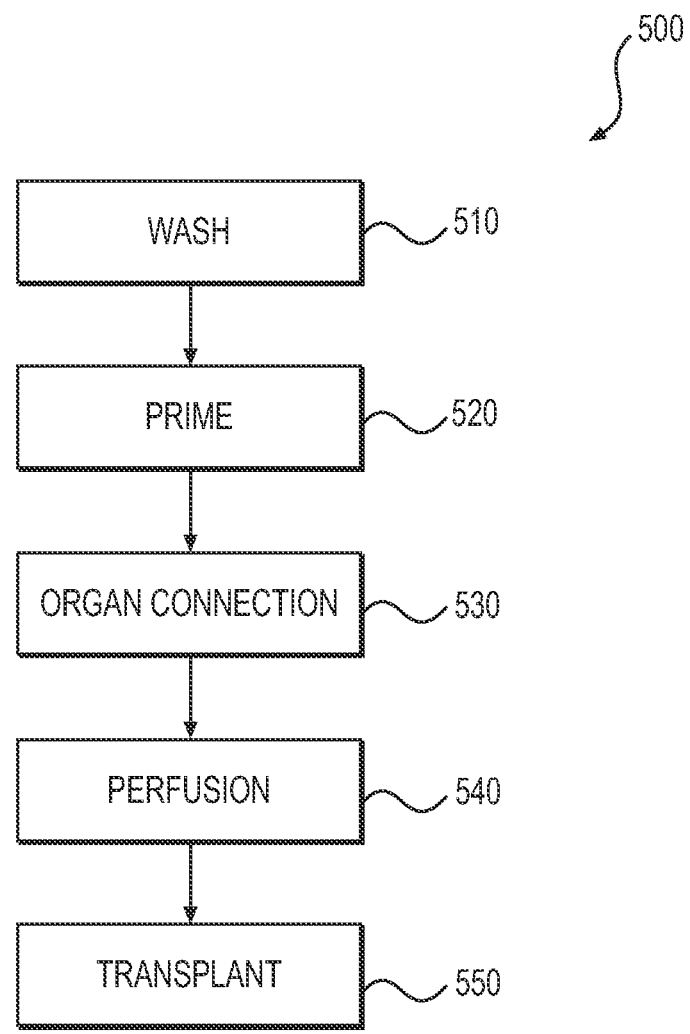
FIG. 7 shows a method of organ perfusion using the device of FIG. 1.

FIG. 7 shows a simplified method of operating the device 100. During routine set up of the device, the pump 210 may first be primed with cold liquid perfusate solution to eliminate all air from the perfusion circuit, including the tube set held by the tube frame 400. This may be done by way of a pre-programmed wash mode 510 followed by a prime mode 520 in the device's perfusion tubing circuit. Sensors in the device 100 may ensure that acceptable cold temperature conditions are met before a donor kidney (or other organ or tissue) may be canulated at a step 530 via its renal artery (or other vessel depending on the organ or tissue type). The height of the liquid perfusate solution in the cassette 65 may depend on various factors such as the amount of the liquid perfusate added to the cassette by the clinician and the volume of the organ within the cassette. Once the kidney is canulated, a perfusion mode 540 during which the liquid perfusate solution is pumped to the kidney or other organ or tissue may begin. Perfusion during the step 540 may take place over a broad range of time, and the device 100 may be transported from one location to another during this time. Normally, there are no functional issues during step 540 with performance over a range of perfusion flow rates and renal pressures, which results in improved viability of kidney function prior to transplant. Clinicians and technicians may monitor during the step 540 several key variables such as renal pressure and flow rate of liquid perfusate, which are indicators of organ viability during this time, and they may decide when to stop pumping the liquid perfusate solution with the pump 210 based on these variables, and others, prior to proceeding with surgical transplant of the organ at step 550.

Under normal conditions during the perfusion mode 540, an issue may occur where a sensor of the device 100 may detect an errant small air bubble "in line" of the perfusion tube circuit. One example of this sensor is air/bubble detector 485 shown in FIG. 5. As shown in that Figure, the detector 485 may include a U-shaped channel in which the tubing, e.g., tube 440 or tube 460, is placed so that the wall of the tubing is tightly fit to the U-shaped channel. The detector 485 may be an ultrasonic sensor that is ultrasonically coupled because of the tight fit and resulting compression of the tubing within the U-shaped channel. This arrangement may ensure that the detector 485 does not need to interface at all with the internal portion or fluid path of the liquid perfusate in the tubing in order to perform air/bubble detection, thus allowing it to perform its function without compromising sterility of the liquid perfusate.

If the detector 485 detects air or a bubble by way of, say, an instantaneous density change of the liquid perfusate, the device may be programmed to react automatically to eliminate that risk not to infuse air bubbles into the kidney's renal artery. For example, the device 100 may stop pumping of the liquid perfusate by the pump 210, and it may then open valves, e.g., solenoid blade valves, to flush the air out of the system. If the air is removed automatically, the device 100 may be programmed to then re-start pumping of the liquid perfusate solution by way of the pump 210 without intervention of an operator or clinician. As explained previously, if for some reason the device stops perfusion for a lengthy period of time, say in the event of power outage or due to a leak in the cassette's tubing, the device may go into a static cold storage ("SCS") mode during which the kidney or other organ or tissue is kept at hypothermic conditions. During this time the organ may remain in fluid contact surrounded by the cold liquid perfusate solution in the cassette 65, thus maintaining its hypothermic temperature and thus its viability. This situation is no worse than the old method of short-term storage "on ice" of donor organs and may not prevent that organ from being transplanted into a recipient if hypothermic conditions are maintained.

But during the perfusion mode 540, if a leak of the liquid perfusate occurs in the perfusion circuit tubing, including the tube set of the tube frame 400, the kidney or other organ or tissue may lose its protection from the cold liquid perfusate and temperature may adversely increase. There is a chance that the clinician will not notice this event, thus resulting in loss of the organ even if only a short period of time elapses because the organ may warm past the hypothermic conditions. Also, during transport that may be several hours, there may be no monitoring by the clinician, so a failure such as a leak in the tube set could result in catastrophic failure and damage to the kidney or other organ or tissue. And while being transported it is unlikely that a clinician would be available to intervene, e.g., stop pumping of the pump 210 or add more liquid perfusate solution to the cassette 65, to ensure that the donor organ remains within the SCS cold hypothermic conditions.

Figure 8:
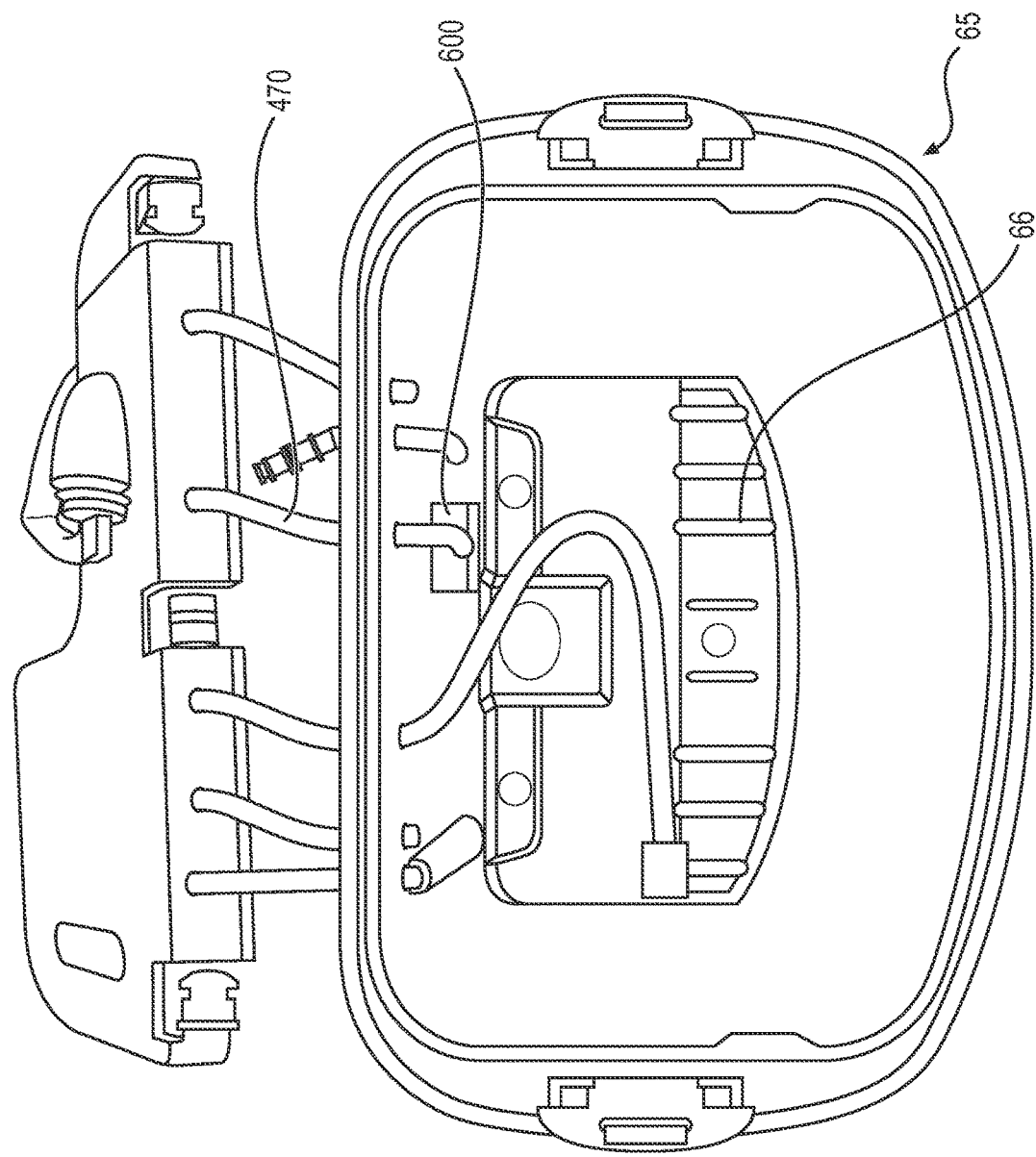
FIG. 8 shows an interior view of the cassette shown in FIG. 6.

So as shown in FIG. 8 of this application, the cassette 65 may include therein a low fluid level detection device or standpipe 600. The standpipe 600 may be a clear, one-piece, plastic, injection-molded component, and it may be positioned within the fluid path of the cassette 65 near the tube 470 where there is a constant negative pressure while pumping by the pump 210, thus drawing the liquid perfusate solution out of the cassette 65, into the tube set, and eventually into the cannula that may be attached to the renal artery of the kidney. The standpipe 600 may have a fixed vertical height relative to the height of the cassette 65, and it may divide the interior of the cassette 65 into a secondary chamber 610 formed by the walls of the standpipe and a larger main chamber 66 constituted by the walls of the cassette 65. The standpipe 600 may be disposed along a wall of the cassette 65, and it may be positioned such that an end of the tube 470 may be placed inside the secondary chamber 610 of the standpipe. The end of the tube 470 may be positioned so that the opening of the tube is positioned as close as possible to the bottom of the secondary chamber 610 formed by the standpipe 600. This may ensure optimal performance in the event of a leak in the tubing. On the other hand, if the opening at the end of the tube 470 is higher relative to the bottom of the secondary chamber 610, it may take less time to respond and stop pumping by the pump 210.

Figure 11:
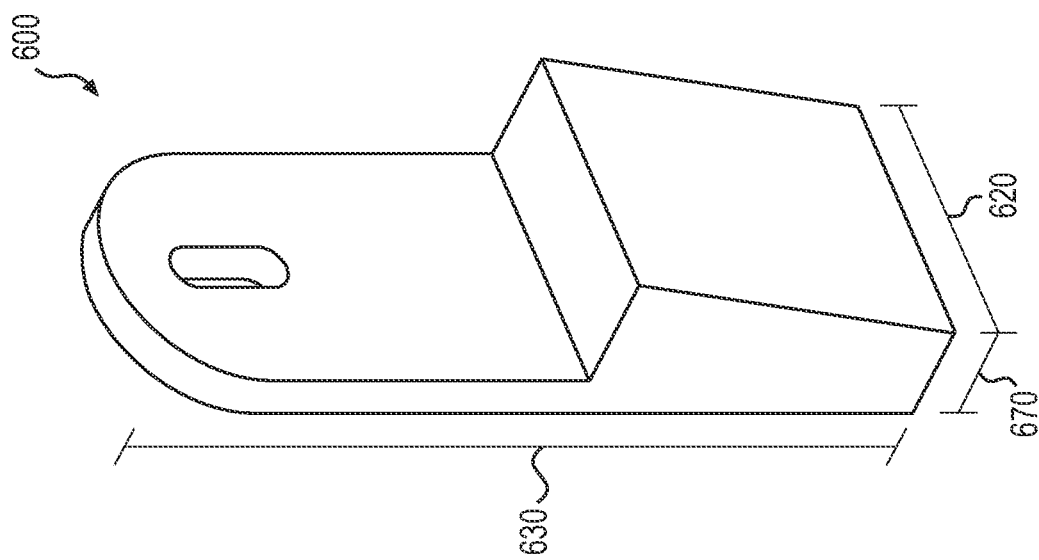
FIG. 11 shows a front perspective view of a low fluid level detection device or standpipe useable in conjunction with the cassette shown in FIG. 8.
Figure 10:
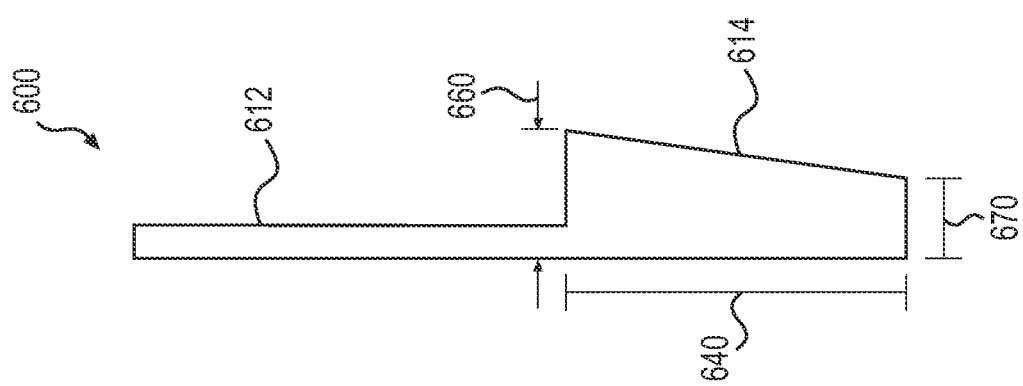
FIG. 10 shows a side view of a low fluid level detection device or standpipe useable in conjunction with the cassette shown in FIG. 8.
Figure 9:
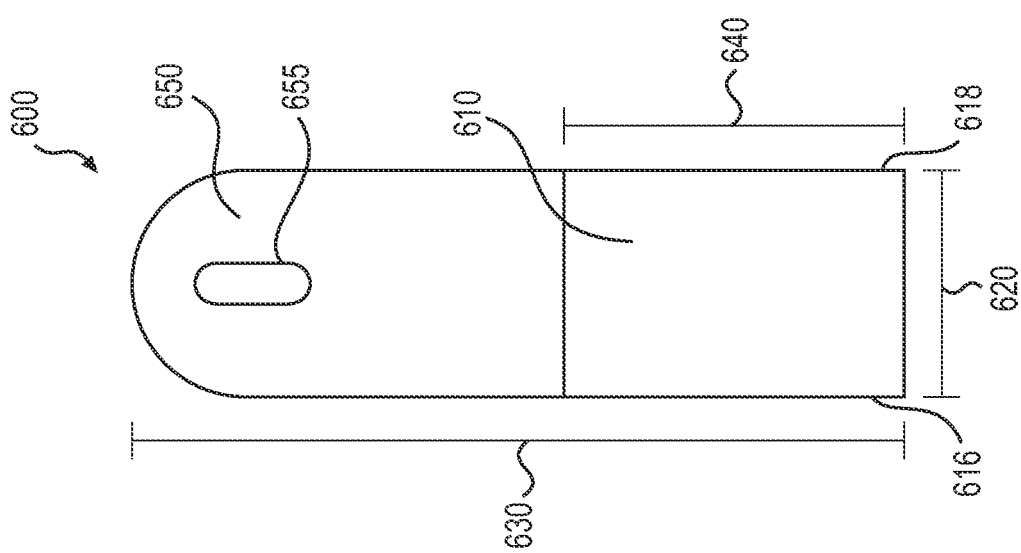
FIG. 9 shows a front view of a low fluid level detection device or standpipe useable in conjunction with the cassette shown in FIG. 8.

FIGS. 9-11 show the standpipe 600 in greater detail. The standpipe may be constituted by a rear wall 612, a shorter front wall 614, and side walls 616 and 618. The standpipe may generally be divided into a lower portion at which the walls 612, 614, 616, and 618 form the secondary chamber 610 and an upper attachment portion 650 by which the standpipe 600 may be secured to the cassette 65. For example, the standpipe 600 may be secured at the attachment portion 650 by way of the tube 470 extending through a hole 655 of the rear wall 612. A width 620 of the standpipe 600 may be equal to or about 0.95 in. A height 630 of the rear wall 612 of the standpipe 630 may be equal to or about 4.9 in. A height 640 of the walls 614, 616, and 618 forming the secondary chamber 610, and thus a height of that secondary chamber 610, may be equal to or about 2.6 in. And as can best be seen in FIG. 10, the side walls 616 and 618 may project outward from the bottom of the standpipe 600 to the height 640. The depth 670 of the standpipe 600 at its bottom may thus be equal to or about 0.37, and the depth 660 of the standpipe 600 at the height 640 may be equal to or about 0.65 in. The dimensions of the standpipe 600 may be selected so that the volume of the secondary chamber 610 is as small as possible relative to that of the main chamber. This may reduce the amount of liquid perfusate lost in the event of a leak in, say, the tubing outside of the cassette 65. The described dimensions and shape of the standpipe 600 may also be preferable, as they allow the standpipe 600 to be formed by way of injection molding.

The relative volumes of the main chamber 66 and the secondary chamber 610 are of critical importance to the functionality of the safety performance described herein. To that end, the volume of the secondary chamber 610 may be between 8 mL and 12 mL, more preferably between 10 mL and 11 mL, and even more preferably equal to or about 10 mL, and the volume of the main chamber 66 may be between 1.0 L and 2.0 L, more preferably equal to or about 1.0 L. In use, the volume of liquid perfusate in the main chamber 66 may be less than the volume of the main chamber 66. For example, the volume of the liquid perfusate may be in a range of about 1.0 L to about 1.5 L. And as shown schematically in FIGS. 13 and 14, the relative heights of the cassette 65 and the standpipe 600 are likewise of critical importance. To that end, distance 680 shows the distance between the top 67 of the cassette 65 and the top of the walls 614, 616, and 618 that form the secondary chamber 610. As used herein, "top of the secondary chamber" recited in the claims of this application may refer to the top of the walls 614, 616, and 618. This distance 680 may be from 1.3 in. to 2.1 in., and more preferably from 1.7 in. to 1.9 in. This distance 680 may position the standpipe 600 in a locked and fixed position relative to a height of the liquid perfusate solution in the main chamber 66.

Figure 12:
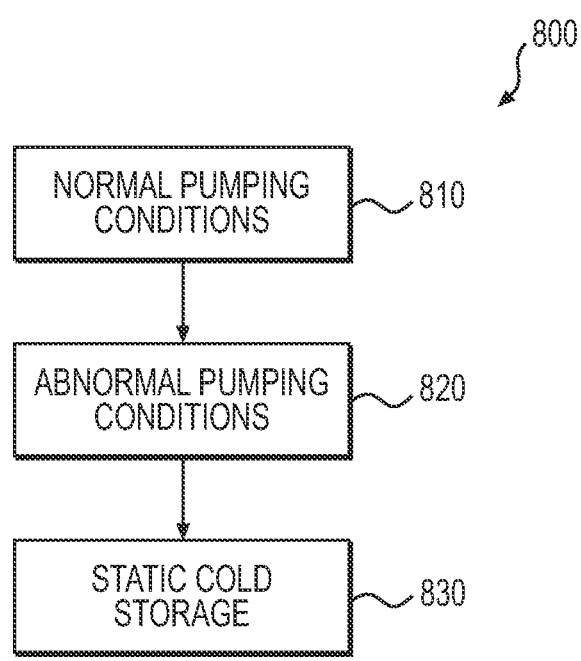
FIG. 12 shows a method of organ perfusion using the low fluid level detection device or standpipe useable in conjunction with the cassette shown in FIG. 8.
Figure 13:
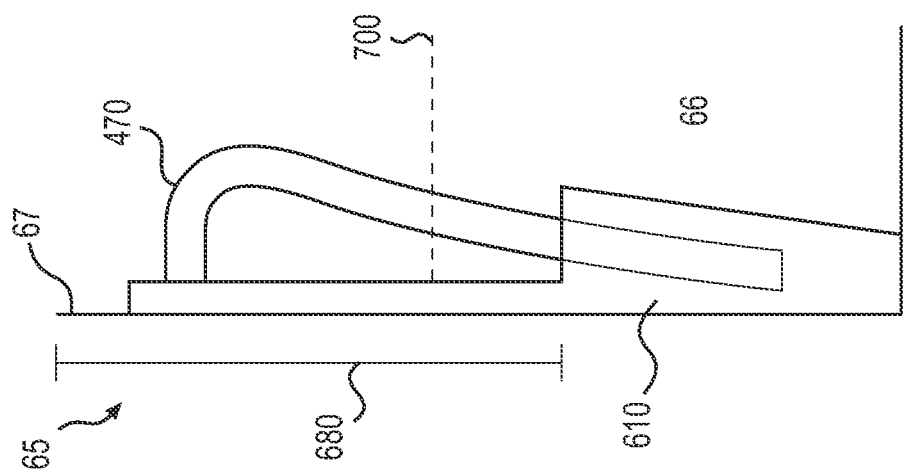
FIG. 13 shows a schematic view of the cassette and standpipe of FIG. 8 in normal operation.

FIG. 12 shows steps of perfusion with a cassette 65 equipped with the standpipe 600. During normal pumping conditions 810, the liquid perfusate level 700 within the cassette 65 may be above the walls 614, 616, and 618 of the standpipe 600, as shown in FIG. 13. This may ensure that the secondary chamber 610 of the standpipe 600 too is filled with the liquid perfusate. Pumping by the pump 210 may thus remove liquid perfusate from the secondary chamber 610, but it is then immediately re-filled because the walls 614, 616 and 618 of the standpipe 600 are lower than the liquid perfusate level 700 within the cassette 65. As a result, if the liquid perfusate in the cassette 65 remains at a normal operating volume, the secondary chamber 610 remains filled even during high and low pressures and resultant high and low pumping flow rates.

Figure 14:
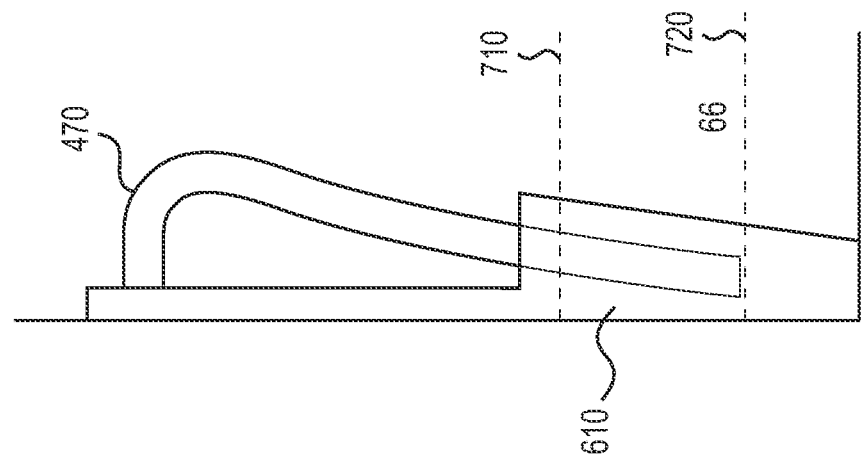
FIG. 14 shows a schematic view of the cassette and standpipe of FIG. 8 at the instant a leak has occurred.

But during abnormal pumping conditions 820, such as in the event of a leak anywhere in the perfusion circuit fluid path tubing outside of the cassette 65, for example in the tube frame 400 or filter circuit portions, the liquid perfusate solution within the cassette 65 may drop to a level 710 below the height of the walls 614, 616, and 618, as shown in FIG. 14. Because the volume of the secondary chamber 610 is so small relative to that of the main chamber 66, when this occurs the amount of liquid perfusate solution in the secondary chamber may quickly be reduced further by way of the pumping of the pump 210 while the liquid perfusate level in the main chamber remains at level 710. And once the liquid perfusate solution is suitably taken from the secondary chamber 610 so as to be at a level 720 below the end of the tube 470, the secondary chamber 610 will not refill due to its fixed and locked position relative to the fluid height within the cassette 65, so a large amount of air may quickly be drawn into the tube 470, which will cause an air alert to be generated by way of the air/bubble detector 485 and the pump 210 to thus stop pumping. Because the liquid perfusate is cooled to hypothermic temperatures, the device may then enter static cold storage at step 830, which may be maintained until transplantation. This may ensure that, even in the event of a leak of the liquid perfusate outside the cassette 65, a preset volume of the cold liquid perfusate solution will be maintained within the cassette 65 and the donor kidney or other organ or tissue will remain in contact with the liquid perfusate at cold hypothermic temperature conditions.

The standpipe 600 described herein may thus be completely passive in operation, and it may require no mechanical or electrical sensors, no extra software to operate and perform its function, and no technician or clinician to intervene. The result is that the kidney or other tissue remains at hypothermic conditions, which is the baseline required to ensure that no damage occurs in the event of a leak of the liquid perfusate solution. In practice, at a simulated leak rate up to and greater than 300 mL/hour, which is considered a worst-case maximum leak rate to be expected in the clinic, the level of the liquid perfusate solution within the cassette 65 quickly reduces to below the top of the walls 614, 616, and 618 of the standpipe 600, resulting in air ingress into the tube 470. Depending on the magnitude of the leak and the liquid perfusate flow rate and height within the cassette 65, it may take a few seconds to a few minutes or longer for the level of the liquid perfusate solution within the cassette 65 to reduce below the top walls of the standpipe. As discussed previously, when air is detected by the system bubble detector 485, the pump 210 immediately stops pumping, thus ensuring that enough liquid perfusate solution remains in the cassette 65 in contact with the kidney. Further testing with a controlled simulated leak rate shows that, during low renal pressure of 10 mmHg as controlled by the pump 210, which translates to a relatively low flow rate of liquid perfusate solution within the renal artery, the standpipe 600 allows air to enter quickly the tube 470, resulting in shut down of the pump 210. Then, with high renal pressure of 65 mmHg as controlled by the pump 210, which translates to a relatively higher flow rate within the renal artery, the device 100 also quickly shuts down the pump 210. So in all performance scenarios of high and low renal pressures and flow rates, it was verified that the device 100 went into its failsafe SCS mode as a result of an "unrecoverable fault condition" caused by loss of the liquid perfusate solution. To compare, if a leak occurred without the standpipe 600, the entire cassette 65 may empty of the cold liquid perfusate, and the temperature of the kidney or other organ or tissue will thus rise as a result.

While the invention has been described in conjunction with specific embodiments thereof, it is evident that many alternatives, modifications and variations may be apparent to those skilled in the art. For example, the invention has primarily been described in connection with perfusion of a kidney. But other organs and tissues such as the heart, liver, and lungs are well within the scope of the invention. Further, modifications to the invention include using T-fittings with venturi restrictors as well as hydrophobic membranes incorporated into molded fittings, although these may be more complex, may have higher cost to implement, and may have more manufacturing difficulties to maintain performance quality. Accordingly, the embodiments of the invention as set forth herein are intended to be illustrative, not limiting. Various changes may be made without departing from the spirit and scope of the invention.

What is claimed is:

1. An apparatus for holding an organ or tissue for at least one of perfusion, storage, diagnosis, and transport of the organ or tissue, the apparatus comprising:
   a portable housing comprising:
      a main chamber within which the organ or tissue and a liquid perfusate for the organ or tissue may be located; and
      a secondary chamber that is within the main chamber and that is for holding the liquid perfusate, a volume of the secondary chamber being less than a volume of the main chamber, and a top of the secondary chamber being below a top of the main chamber;
   at least one tube for moving the liquid perfusate to and from the portable housing, an end of a first tube of the at least one tube being located within the secondary chamber, and the liquid perfusate exiting the portable housing by way of the end of the first tube;
   a pump for circulating the liquid perfusate from the first tube to perfuse the organ or tissue; and
   a bubble detector configured to detect air in the liquid perfusate having exited the portable housing by way of the end of the first tube, wherein
   when a level of the liquid perfusate in the secondary chamber falls below the end of the first tube so that the bubble detector detects air in the liquid perfusate, the apparatus is configured to stop the perfusion of the organ or tissue while a preset volume of the liquid perfusate remains in the main chamber so that the organ or tissue stays in contact with the liquid perfusate.

2. The apparatus of claim 1, wherein:
   the volume of the main chamber is from 1.0 L to 2.0 L; and
   the volume of the secondary chamber is from 8 mL to 12 mL.

3. The apparatus of claim 2, wherein:
   the top of the secondary chamber is lower than the top of the main chamber by 1.3 in. to 2.1 in.

4. The apparatus of claim 1, wherein the secondary chamber is disposed along a wall that forms the main chamber.

5. The apparatus of claim 1, further comprising a standpipe that forms the secondary chamber and that includes an attachment portion by which the standpipe is secured within the main chamber so that a position of the standpipe is controlled relative to the top of the main chamber.

6. The apparatus of claim 5, wherein the attachment portion comprises a hole through which the first tube projects before entering the secondary chamber.

7. The apparatus of claim 1, wherein
   during the perfusion the liquid perfusate flows from the main chamber to the secondary chamber to exit the portable housing by way of the first tube located within the secondary chamber.

8. The apparatus of claim 7, wherein the liquid perfusate is chilled to a hypothermic temperature.

9. A method of at least one of perfusion, storage, diagnosis, and transport of an organ or tissue, the method comprising:
   placing the organ or tissue in a main chamber of a portable housing so that a liquid perfusate in the main chamber is above a top of a secondary chamber that is located in the main chamber, a volume of the secondary chamber being less than a volume of the main chamber, and the top of the secondary chamber being below a top of the main chamber;

perfusing the organ or tissue so that the liquid perfusate flows from the main chamber to the secondary chamber and so that the liquid perfusate exits the portable housing by way of a first tube, an end of the first tube being located within the secondary chamber; and when a level of the liquid perfusate in the secondary chamber falls below the end of the first tube so that a bubble detector detects air in the liquid perfusate having exited the portable housing by way of the first tube, stopping the perfusion so that a preset volume of the liquid perfusate remains in the main chamber so that the organ or tissue stays in contact with the liquid perfusate.

10. The method of claim 9, wherein the first tube provides an inlet to a pump for circulating the liquid perfusate to perfuse the organ or tissue.

11. The method of claim 9, wherein the perfusion is stopped if the liquid perfusate is no longer above the top of the secondary chamber.

* * * * *